(12) United States Patent
Fong et al.

(10) Patent No.: US 6,673,489 B2
(45) Date of Patent: Jan. 6, 2004

(54) ELECTRIC BATTERY ASSEMBLY AND METHOD OF MANUFACTURE

(75) Inventors: Wendy Fong, Alhambra, CA (US); Mikito Nagata, Valencia, CA (US); Andrew Szyszkowski, Canyon Country, CA (US); Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 94 days.

(21) Appl. No.: 10/034,990

(22) Filed: Dec. 28, 2001

(65) Prior Publication Data
US 2003/0124420 A1 Jul. 3, 2003

(51) Int. Cl.$^7$ ................................................ H01M 2/02
(52) U.S. Cl. ........................ 429/181; 429/175; 429/178; 429/185
(58) Field of Search ................................ 429/175, 178, 429/181, 185

(56) References Cited

U.S. PATENT DOCUMENTS

| | | | |
|---|---|---|---|
| 3,245,837 A | 4/1966 | Ikeda et al. | |
| 5,770,332 A | * 6/1998 | Narukawa et al. | .......... 429/175 |
| 5,851,244 A | 12/1998 | Tuttle | |
| 5,896,647 A | 4/1999 | Shkuratoff | |
| 6,103,418 A | 8/2000 | Sato et al. | |
| 2002/0061438 A1 | 5/2002 | Inoue et al. | |

* cited by examiner

Primary Examiner—Carol Chaney
Assistant Examiner—Dah-Wei Yuan
(74) Attorney, Agent, or Firm—M. Elizabeth Bush

(57) ABSTRACT

An energy storage device, such as an electrical storage battery, having a unique terminal structure, sealing arrangement and an S-shaped mandrel for the electrode assembly. The battery generally includes a case in which an electrode assembly is dispose, and a cover provided with a fill hole and fill plug, and a terminal structure that forms a battery terminal. The terminal hole and the fill hole have counter bore structure to provide tighter sealing. A nickel layer is provided on the aluminum fill plug to facilitate electrical contact with the external circuit. A mandrel is provided for the rolled electrode assembly, and is electrically coupled to the terminal structure via a push-in tab inserted into a space in the S-shape of the mandrel.

16 Claims, 4 Drawing Sheets

US 6,673,489 B2

ELECTRIC BATTERY ASSEMBLY AND METHOD OF MANUFACTURE

BACKGROUND OF THE INVENTION

1. Field of the Invention

This invention relates generally to an energy storage device, and more particularly, to an electrical storage battery useful in medical devices and a method for manufacturing the same.

2. Description of the Related Art

Electrical storage batteries are in use in a wide range of applications. As improved battery technology allows battery use in more and more demanding applications, the requirements imposed on the batteries' physical construction increase as well. For example, new battery technologies have yielded small and lightweight batteries with long storage lives and high energy output capabilities. As the size of these batteries has decreased, an expanded range of applications has developed, including many in which the battery is implanted along with an associated battery powered device inside the body of a human patient. These devices are now used to monitor and treat human disease conditions and to maintain normal body functioning in a variety of applications.

Batteries for medical devices are subject to very exacting requirements, such as a long useful life, high power output, low self-discharge rate, compact size, high robustness and reliability over a long time, compatibility with the patient's internal body chemistry, highly reliable sealing components, etc. In addition, the manufacture and assembly of the batteries should be as simple and low-cost as possible.

SUMMARY OF THE INVENTION

The present invention is directed to an energy storage device, more specifically to an electrical storage battery assembly, and related manufacturing method that substantially obviate one or more of the problems due to limitations and disadvantages of the related art.

An object of the present invention is to provide an energy storage devices and manufacturing method that will provide devices that having a reliable, secure, and robust construction, and that are suitable for use in medical devices.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

The energy storage device according to the present invention generally includes a case, an electrode assembly disposed within the case, a cover disposed to cover the opening of the case, and a terminal structure attached to the cover.

In one aspect of the present invention, the cover is provided with a hole having a counter bore structure, and the terminal structure includes a gasket made of an insulating material and fittingly disposed within the hole and the counter bore, an under cover insulator member disposed below an under side of the cover, the insulator member defining a hole corresponding to the hole in the cover, a washer made of a conductive material and electrically connected to one of the electrode members of the electrode assembly, the washer being disposed below the insulator member and defining a hole corresponding to the hole in the cover, and a fastening device made of a conductive material and having a shaft passing through the gasket and the holes in the insulator member and the washer, the fastening device applying a pressure in an axial direction of the hole in the cover to press the gasket, the cover, the insulator and the washer against each other to form a seal, the fastening device being electrically connected to the washer and electrically insulated from the cover. Sealing rings may be provided between the gasket and the fastening device or between the gasket and the cover to provide a better seal.

In another aspect of the invention, the terminal structure uses a fastening device that is made of stainless steel.

In another aspect of the invention, the cover is provided with a hole (fill hole) having a counter bore structure, and a plug (fill plug) is fittingly disposed in the counter bore of the hole and fixed to the cover to seal the hole.

In another aspect of the invention, the cover is made of aluminum and electrically connected to one of the electrode members of the electrode assembly, and a disk-shaped aluminum plug (fill plug) is provided to seal a hole (fill hole) in the cover, the plug having a layer of a second metal or metal alloy formed on a top surface thereof and electrically connected to the aluminum to form a terminal of the energy storage device.

In another aspect of the invention, the cover has a first and a second hole, wherein the cover has a symmetrical shape and wherein the first and second holes are located symmetrically with respect to the cover and have identical shapes and sizes. The first hole has a terminal structure disposed therein to form a terminal of the energy storage device, and the second hole (fill hole) has a plug (fill plug) disposed therein to seal the hole.

In another aspect of the invention, the periphery of the cover or the rim of the case is provided with a cutaway portion that forms a step feature.

In another aspect of the invention, the electrode assembly including a mandrel and the electrode members are wound around the mandrel to form a roll. The mandrel is electrically connected to one of the electrode members. The mandrel is made from a metal plate having a center portion and two bent portions forming an S-shape, the bent portions exerting a spring tension on the rolled electrode assembly. The energy storage device may further include a conductive terminal connector with a tab portion forming a spring structure that is inserted into the mandrel in a space between the center portion and one of the bent portions of the mandrel. A base portion of the terminal connector is fixed to and electrically connected to the terminal structure.

In another aspect of the invention, an adhesive insulating film is disposed in the case to insulate a bottom of the case from a bottom part of the electrode assembly, the adhesive insulating film being adhered to either the bottom of the case of the bottom of the electrode assembly.

It is to be understood that both the foregoing general description and the following detailed description are exemplary and explanatory and are intended to provide further explanation of the invention as claimed.

DETAILED DESCRIPTION OF THE PREFERRED EMBODIMENTS

The present invention and the embodiments apply generally to energy storage devices, such as electrical storage batteries, capacitors, etc. The following detailed description uses an electrical storage battery as an example, but the invention as defined by the claims is not limited to batteries.

Figure 1:
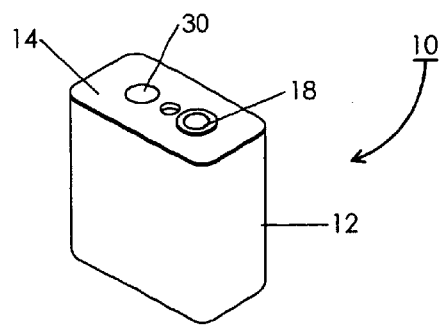
FIG. 1 schematically illustrates the exterior of an energy storage device according to an embodiment of the present invention.
Figure 2:
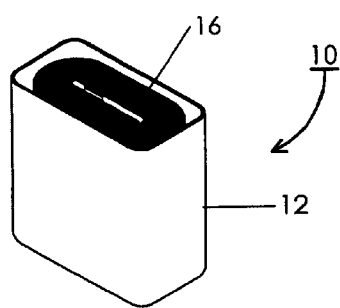
FIG. 2 shows an electrode assembly disposed within the case of the energy storage device.

An electrical storage battery according to embodiments of the present invention is described with reference to the drawings. The structure of the electrical storage battery is described generally first, followed by detailed descriptions of the various parts. As shown in FIGS. 1 and 2, the battery 10 generally comprises an electrode assembly 16 disposed within a case 12, which has an opening covered by a top cover 14. The electrode assembly 16 includes a positive electrode member and a negative electrode member, and one or more separate member interposed in between. In one embodiment, the electrode members and the separator member are in the form of electrode sheets and separate sheets, which are stacked together and rolled into a roll. Alternatively, the electrode assembly may have a stacked structure where a plurality of positive electrode members, a plurality of negative electrode members and a plurality of separator members having a generally flat shape form a multi-layered stacked with the separator members separating the electrode members. A first one of the electrode members is electrically connected to the case 12, which serves as the first terminal of the battery. The second one of the electrode members is electrically connected to a terminal structure having a rivet 18 that passes insulatively through a hole in the top cover 14 to serve as the second terminal of the battery.

The battery has a generally cylindrical shape, and the case member 12 constituting the side walls and bottom wall of the cylinder. The case 12 and the cover 14 are made of thin conductive materials such as a metal or metal alloy. Preferably, they are made of aluminum. In the battery shown in FIGS. 1 and 2, the cross-section of the cylinder (cut in a plane perpendicular to the longitudinal direction of the cylinder), which corresponds to the shape of the top cover 14, is substantially rectangular with rounded corners. This type of battery is sometimes referred to as a prismatic battery by those skilled in the field. Alternatively, the cross section may be an oval, a rectangle with two half-circles at the ends, or other generally elongated shapes.

Figure 3:
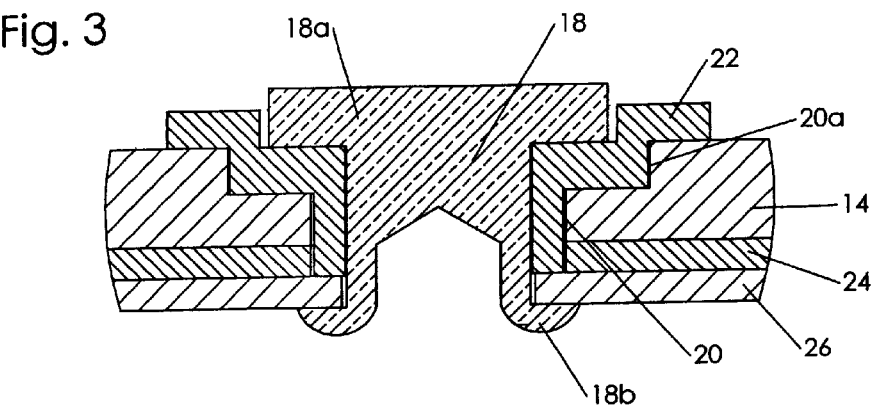
FIG. 3 depicts a terminal structure for a terminal of the energy storage device according to an embodiment of the present invention.
Figure 3A:
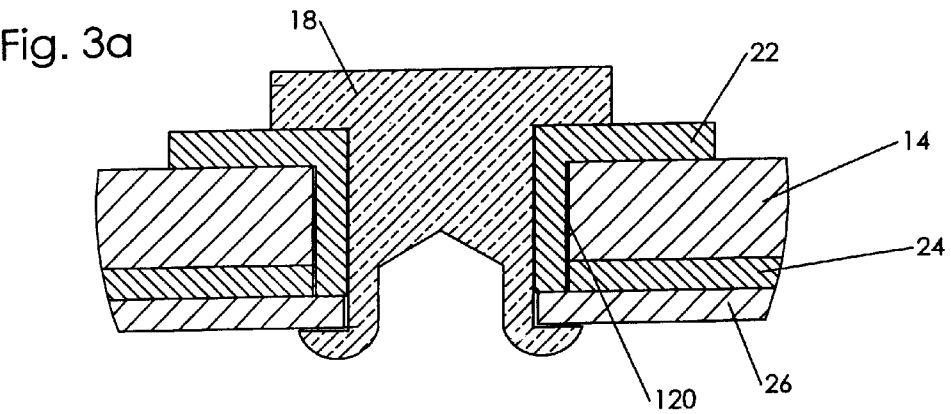
FIG. 3a depicts a comparison structure of a terminal structure.

FIG. 3 is a cross-sectional view depicting the structure of the terminal structure employing a rivet 18. For purposes of illustration, the parts in FIG. 3 are shown with spaces in between, while in the actual structure the parts fit together to form a sealed structure with little or no space in between. FIG. 3 shows a rivet hole 20 formed in the cover 14, through which an insulative gasket 22 is disposed. The rivet hole 20 has a counter bore 20a, and the gasket 22 fits against the inner surfaces of both the hole and the counter bore. The counter bore 20a may be formed by punching. Compared with a comparison structure where the rivet hole 120 is formed of a straight hole without a counter bore (FIG. 3a), the counter bore structure shown in FIG. 3 decreases the likelihood of electrolyte leakage by creating a longer leak pathway (the area between the gasket 22 and the hole/counter bore 20/20a) with sharp edges. An undercover insulator member 24 is disposed under the cover 14 and has a hole corresponding to the rivet hole 20 of the cover. A metal washer 26 is disposed below the insulator 24. The lower portion of the rivet 18 is pressed to form a head 18b to rivet together the gasket 22, the cover 14, the insulator 24 and the metal washer 26 to seal the rivet hole. By this structure, the upper head 18a of the rivet is electrically insulated from the battery cover 14, and electrically coupled to the metal washer 26, which is in turn electrically coupled to the electrode member as will be described later. Instead of a rivet 18, other kinds of bolts or other fastening devices having a shaft passing through the rivet hole may be used. The fastening device applies a pressure in the axial direction of the rivet hole to press the gasket 22, the cover 14, the insulator 24 and the metal washer 26 against each other to form a seal.

The gasket 22 and the insulator 24 are preferably formed of DuPont Teflon® PFA perfluoroalkoxy copolymer resin, or other suitable materials, and the metal washer 26 is preferably made of copper, copper alloy, or nickel. The rivet 18 is made of stainless steel. In existing battery structures, the rivet has been made of nickel, copper, nickel plated steel, or aluminum. Stainless steel rivet provides advantages over these alternative materials because it is easier to resistance weld to the external circuit, and is less likely to result in fragmentation which introduces impurities into the battery case after welding. Stainless steel is also stronger and more corrosion resistant.

Figure 3B:
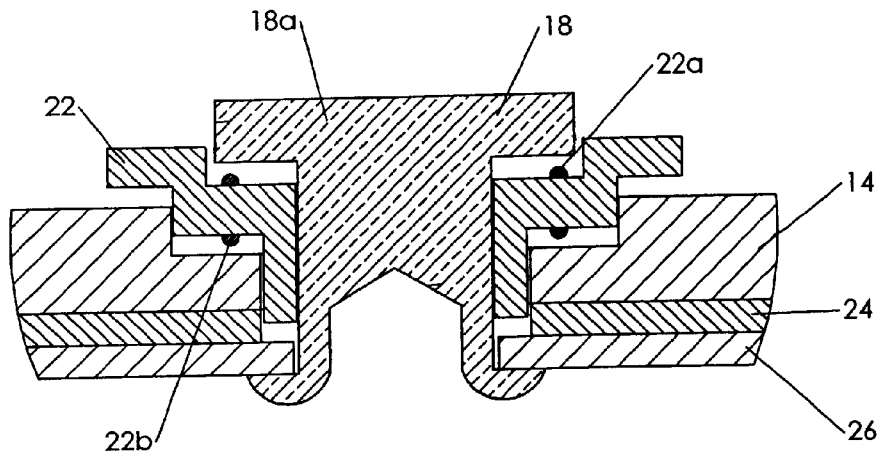
FIGS. 3b, 3c and 3d illustrate alternative structures for a terminal structure having sealing rings.
Figure 3C:
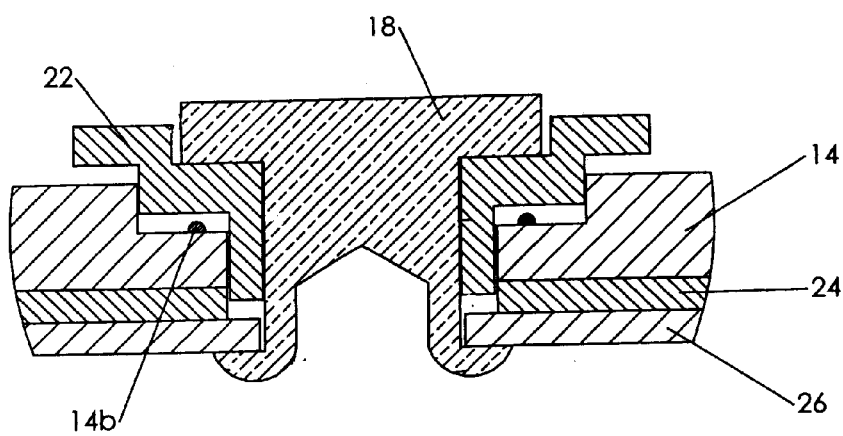
Figure 3D:
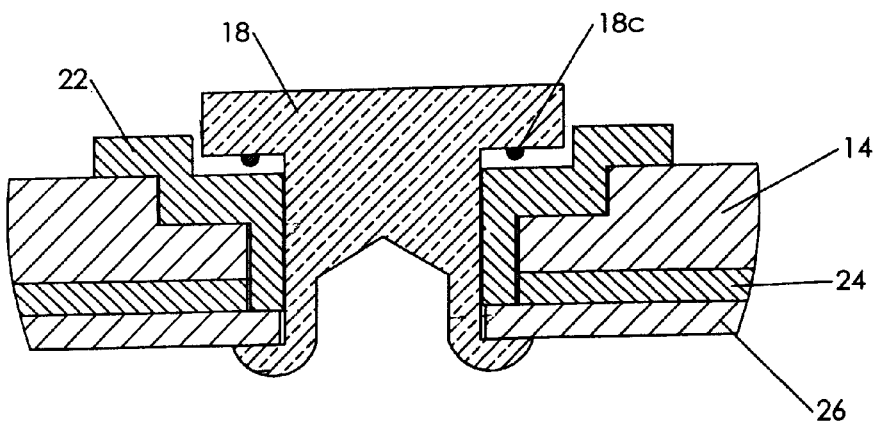

In an alternative embodiment shown in FIG. 3b, a raised sealing ring 22a is formed on the gasket 22 in its contact surface with the underside of the rivet head 18a. Alternatively, a raised sealing ring 22b is formed on the gasket 22 in its contact surface with the cover 14 in the step feature formed by the counter bore. In another alternative embodiment shown in FIG. 3c, a raised sealing ring 14b is formed on the cover 14 in the step feature formed by the counter bore, where it contacts the gasket 22. In yet another embodiment shown in FIG. 3d, a raised sealing ring 18c is formed on the under side of the rivet head 18a in its contact surface with the gasket 22. These various sealing rings may be provided individually or in combination. In the embodiments shown in FIGS. 3b, 3c and 3d, the sealing rings are formed as an integral part (i.e. one-piece) of the gasket 22, the cover 14, or the rivet head 18a. Alternatively, the sealing rings may be formed of separate ring members (i.e. not a part of the gasket 22, the cover 14, or the rivet head 18a) and provided at the appropriate locations. These sealing rings function to increase the pressure between the gasket and the cover and/or the gasket and the rivet, which reduces the risk of an electrolyte leak.

Figure 4:
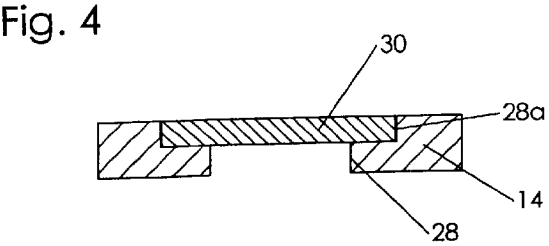
FIG. 4 illustrates a fill hole and fill plug structure according to another embodiment of the present invention.
Figure 4A:
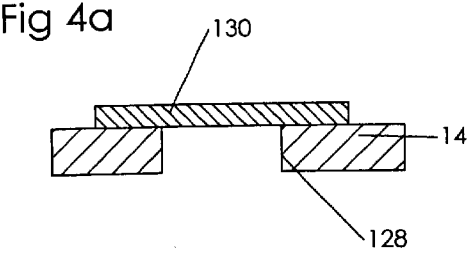
FIG. 4a illustrates a comparison structure of the fill hole and fill plug.

In addition to the rivet hole 20, the top cover 14 is provided with a fill hole 28 for filling the case with an electrolyte solution after assembly, and a fill plug 30 that closes the fill hole (FIGS. 1 and 4). The fill plug is preferably made of the same material as the cover, such as aluminum. Similar to the rivet hole 20, the fill hole 28 has a counter bore 28a, and the fill plug 30 is fitted within the counter bore 28a. The fill plug 30 is fixed to the cover 14, preferably by laser welding between the circumference of the fill plug 30 and the inside surface of the counter bore 28a. In a comparison structure (FIG. 4a), the fill hole 128 is formed of a straight hole without a counter bore. The fill cover 130, which is larger in size than the fill hole, is disposed over the surface of the cover 14 to cover the fill hole and laser welded between the bottom surface of the plug 130 and the top surface of the cover 14. Compared to the comparison structure, the counter bore structure shown in FIG. 4 decreases the likelihood of electrolyte leakage by creating a longer leak pathway (the area between the fill plug 30 and the hole/counter bore 28/28a) with sharp edges. This structure also reduces manufacturing time by allowing for multi-cell top-down welding of the fill plug as opposed to single-cell horizontal welding.

Figure 5A:
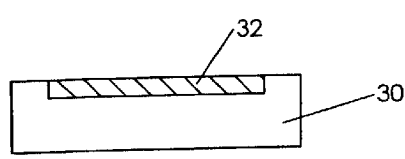
FIGS. 5a and 5b show structures of the fill plug according to another embodiment of the present invention.
Figure 5B:
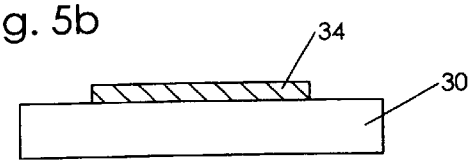

FIGS. 5a and 5b show the structure of a fill plug 30 (cross-sectional view) that is suitable for use as an electrical connection between the battery case and an external electrical circuit connected to the battery. Preferably, the battery case 12 serves as the positive terminal of the battery and the rivet 18 serves as the negative terminal. As described earlier, the case 12 and the cover 14 are preferably made of aluminum. Aluminum, however, is generally unsuitable as a battery terminal because it is difficult to weld to the external circuit of the battery. Thus, when aluminum is used as the battery case and cover, a contact surface formed of a suitable metal such as nickel is desired for connecting to the external circuit. In certain existing battery structures (not shown), the battery case is connected to the external circuit through a tab attached to the case by welding. The tab is a bimetallic strip with an aluminum layer on one side and a nickel side on the other, with the aluminum side welded to the case. This structure presents problems because of difficulties associated with welding nickel to aluminum. This weld can cause damage to the case. Moreover, the tab can become detached after welding. In addition, the tab tends to interfere with other manufacturing operations.

According to an embodiment of the present invention, the fill plug 30 is disk-shaped and made of aluminum, and has a layer of a second metal or metal alloy formed on its top surface. The second metal or metal alloy has a higher melting temperature than aluminum and is suitable for forming an electrical connection with the external circuit (e.g. a flex circuit) by welding, such as resistance welding. The second metal or metal alloy may be nickel, stainless steel, titanium, copper, or alloys thereof. Preferably, the second metal or metal alloy is nickel. The second metal or metal alloy layer may be a clad 32 as shown in FIG. 5a or a deposition layer 34 as shown in FIG. 5b. By using the fill plug 30 having a second layer as a terminal, the tab fixed to the case as described above can be eliminated, thereby avoiding the problems associated with the tab and simplifying the manufacturing process. According to this embodiment, an aluminum plug having a second metal or metal alloy layer is used, rather than a plug entirely made of the second metal or metal alloy, because it may be difficult to hermetically weld a second metal such as nickel (fill plug) to aluminum (cover). In the fill plug of FIG. 5a or FIG. 5b, a minimum clearance of preferably 20 microns is maintained between the edge of the plug 30 and the edge of the clad 32 or the deposition layer 34. This clearance is desired to allow laser welding operation when fixing the plug to the cover. The deposition layer 34 in FIG. 5b may be formed by electroplating or sputtering. When the deposition layer is nickel, a chromium and/or a copper layer, or other suitable metal layers, may be deposited between the aluminum and the nickel to increase the strength of the structure. A mask is required to ensure the clearance. The clad 32 in FIG. 5a may be formed by press fitting. The clad structure 32 tends to provide better mechanical strength than the deposition structure 34 because the aluminum around the second metal or metal alloy acts as a protection. On the other hand, the deposition structure tends to provide better electrical connection than the clad structure 32 because the clad 32 may sometimes become recessed from the surface of the aluminum.

Preferably, the top cover 14 has a symmetrical shape, and the rivet hole 20 and the fill hole 28 are located symmetrically with respect to the cover and have identical shapes and sizes (FIG. 1). This allows either hole to be used as the rivet hole during assembly, simplifying assembly procedures.

Figure 6A:
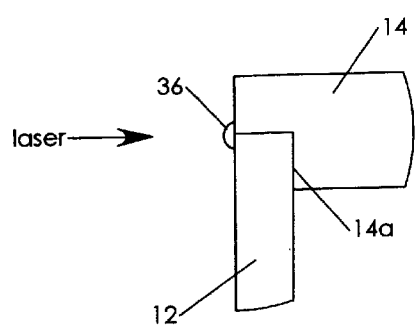
FIGS. 6a and 6b illustrate the sealing between the case and the cover according to embodiments of the present invention.
Figure 6B:
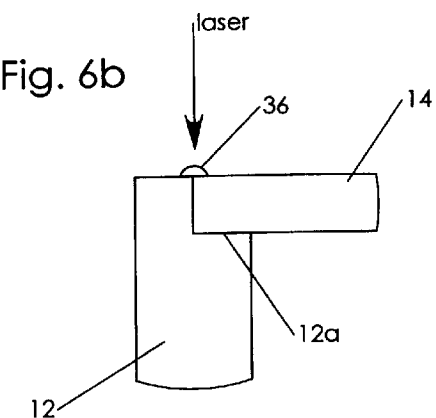
Figure 6C:
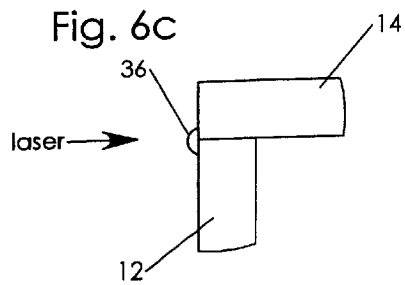
FIGS. 6c and 6d show comparison structures.
Figure 6D:
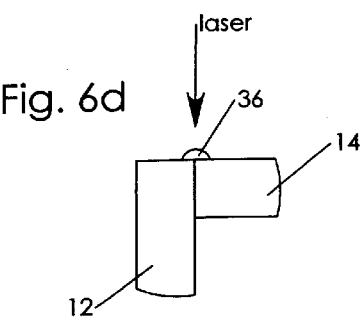

FIGS. 6a and 6b illustrate structures by which the cover 14 is secured to the case 12. In FIG. 6a, the underside of the cover 14 is provided with a cutaway portion along the periphery to form a step feature 14a, allowing the cover 14 to fit over the wall of the case 12. The cover 14 is laser welded to the case 12 with a weld bead 36. The laser is applied from the side direction as indicated by the arrow and the step feature blocks the laser from entering the interior of the case 12. Alternatively, as shown in FIG. 6b, the side wall of the case 12 is provided with a cutaway portion along the upper inside rim to provide a step feature 12a, allowing the cover 14 to rest on the step. The cover 14 is laser welded to the case 12 with a weld bead 36. The laser is applied from the top as indicated by the arrow and the step feature 12a blocks the laser from entering the interior of the case 12. Two comparison structures are shown in FIGS. 6c and 6d. In FIG. 6c, the cover 14 is disposed over the rim of the case 12. In FIG. 6d, the cover is disposed inside the case 12 near the rim. In both structures, no step feature is provided. As a result, the laser light as indicated by the arrows may enter the battery case 12 during welding, causing damages and/or contamination of the electrode assembly 16 and/or the electrolyte within the battery case. Thus, the embodiments of the present invention shown in FIGS. 6a and 6b reduce the risk of weld failure by preventing the laser light from passing through to the inside of the battery case during welding.

Figure 7:
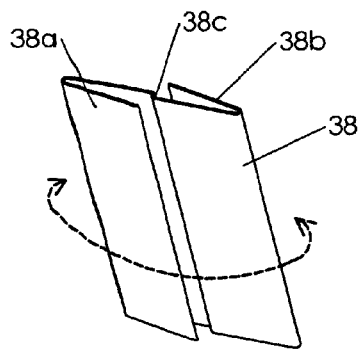
FIG. 7 illustrates an S-shaped mandrel for the electrode assembly according to another embodiment of the present invention.

We turn now to the structure of the electrode assembly 16 (FIG. 2) and its connection to the battery terminals. The electrode assembly 16 shown in FIG. 2 is a rolled electrode assembly, which includes a positive and a negative electrode member physically separated from each other by one or more separator members, the electrode and separator members being stacked together and wound around a mandrel to form the electrode assembly. The separator member physically and electrically separates the positive electrode member from the negative electrode member while allowing for ionic conductivity there between through an electrolyte solution. A first one of the positive and negative electrode members is electrically connected to the case which serves as a first terminal of the battery, and the second electrode member is electrically connected to the mandrel to be connected to a second terminal of the battery formed by a terminal structure. As shown in FIG. 7, the mandrel 38 is formed of a thin metal plate bent at the two ends into a slim S shape in cross-section, where the two bent portions form spring arms 38a and 38b. The mandrel 18 extends in the longitudinal direction for substantially the length of the electrode roll 16, and the electrode and separate members are wound around the mandrel in either direction as indicated by the arrows in FIG. 7. The spring arms 38a and 38b apply a slight spring tension to the rolled electrode assembly 16 when it is wrapped around the mandrel. The spring tension helps to hold the rolled electrode assembly in a tight and uniformly wrapped configuration around the mandrel. The mandrel 38 is preferably made of copper, copper alloy, or nickel, but other suitable materials may also be used. In conventional practice, a mandrel is used to wind the electrode and separate members, and is removed after winding the members. In an alternative conventional structure, the mandrel remains in the electrode roll after winding, but the shape of the mandrel is a flat metal plate. Compared with these conventional structures, an S-shaped mandrel according to an embodiment of the present invention has several advantages. First, the two bent ends of the S-shape increases the pressure on the electrode roll and maintains the homogeneity of the roll. Second, the mandrel can better serve as a heat sink to conduct heat away from the electrode roll in the event of a short circuit to prevent overheating of the battery. Third, the S-shaped mandrel may be used in conjunction with a push-in tab (described below) to form an electrical connection between the electrode member and a terminal of the battery, which reduces manufacturing steps by eliminating the need for welding a jumper wire to the mandrel and the tab.

Figure 8A:
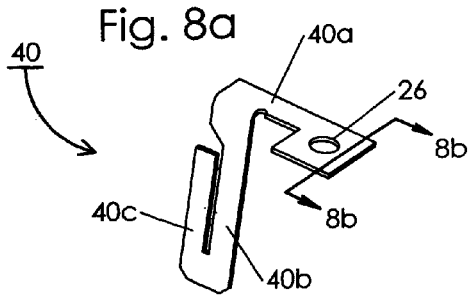
FIGS. 8a and 8b illustrate a terminal connector having a push-in tab according to another embodiment of the present invention.
Figure 8B:
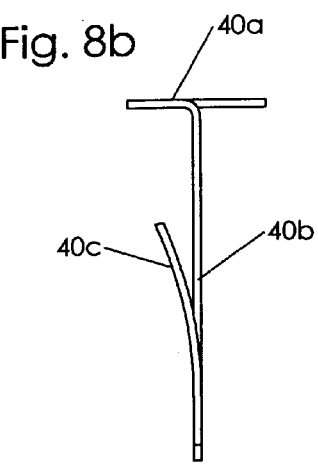

The mandrel 38 of the electrode assembly 16 is electrically connected to the rivet 18 (a terminal of the battery) via the washer 26 (see FIG. 3), which is formed as a part of a terminal connector shown in FIGS. 8a and 8b. FIG. 8a is a prospective view, and FIG. 8b is a side elevation view along the direction indicated by arrows 8b–8b in FIG. 8a. The terminal connector 40 is formed of a metal plate and includes a base portion 40a and a tab portion 40b/40c (push-in tab portion). The base portion 40a, which includes the washer 26, is disposed against the undercover insulator 24 (not shown in FIGS. 8a and 8b) in the assembled battery. The rivet 18 passes through the hole in the washer 26 to fasten the terminal connector 40 to the cover 14 (see FIG. 3). The tab portion 40b/40c is bent substantially perpendicular to the base portion 40a, and includes two elongated portions 40b and 40c with a slit there between, allowing the portion 40c to be bent slightly out of the plane of the portion 40b to form a spring structure (FIG. 8b). The entire terminal connector 40 may be formed from a metal plate, preferably copper, copper alloy, or nickel. Copper is more preferred because of its high conductivity and low contact resistance. In the assembled battery, the push-in tab portion 40b/40c is inserted into the S-shaped mandrel 38 in the narrow space between the spring arm 38a (or 38b) and the center part 38c (see FIG. 7). Due to the spring structure of the tab portion 40b/40c, an electrical connection is formed between the terminal connector 40 and the mandrel 38. By this structure, the electrode assembly 16 is electrically connected to the rivet 18 (the second terminal of the battery).

Figure 9:
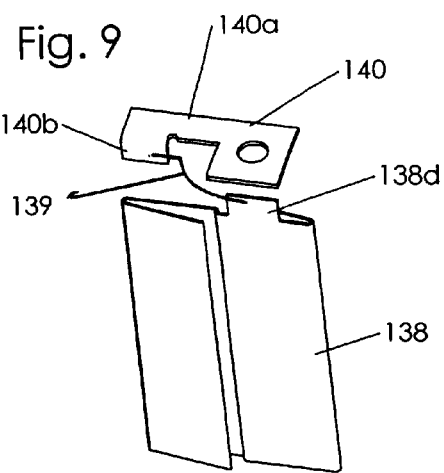
FIG. 9 shows a comparison structure where the terminal connector is connected to the mandrel by a wire.

In a comparison structure shown in FIG. 9, the terminal connector 140 has a base portion 140a and a short bent tab portion 140b extending downwardly, but does not have an extended push-in tab portion 40b/40c. The S-shaped mandrel 138 has a tab 38d extending upwardly. The mandrel is electrically connected to the terminal connector 140 by a conductive wire 139 which is resistance welded to the mandrel tab 138d and the bent tab portion 140b of the terminal connector 140. Thus, the structure of FIG. 7 according to embodiments of the present invention simplifies the manufacturing process by eliminating the connector wire 139 and two resistance welding steps. The push-in tab portion 40b/40c of the terminal connector 40 is easily inserted into the mandrel 38, which greatly increase yield ratios and decreases manufacturing time.

Figure 10:
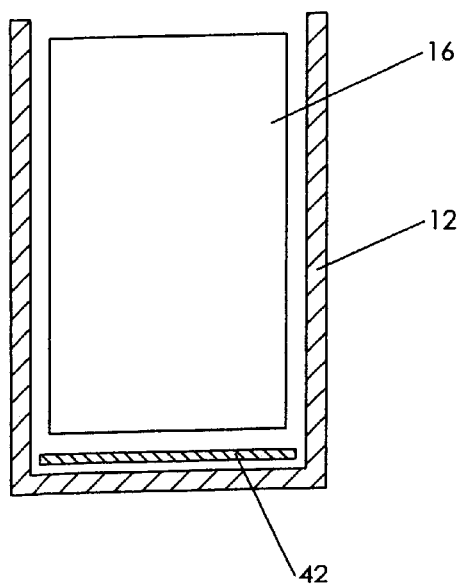
FIG. 10 illustrates an insulating film disposed at the bottom of the case.

Another embodiment of the present invention is shown in FIG. 10. At the bottom of the case 12, between the electrode roll 16 and the bottom of the case, an adhesive insulating film 42 is provided to prevent short circuits between the positive and negative electrode members. Conventionally, an insulating film (non-adhesive) is inserted into the case prior to placing the electrode roll into the case. This process tends to be time-consuming, as the inserted insulating film often becomes misaligned and must be adjusted or re-placed. According to an embodiment of the present invention, an adhesive insulating film 42 is applied with its adhesive surface either to the bottom of the case 12 or the bottom of the electrode roll 16, before the electrode roll is disposed in the case. The adhesive insulating film is preferably a Kapton® polyimide film tape available from DuPont, or other suitable material. The adhesive serves to maintain the position of the insulating film 42 in the case, reducing the execution time for the process step.

It will be apparent to those skilled in the art that various modification and variations can be made in the electrical storage battery of the present invention without departing from the spirit or scope of the invention. Thus, it is intended that the present invention cover modifications and variations that come within the scope of the appended claims and their equivalents.

What is claimed is:

1. An energy storage device comprising:
    a case having an opening;
    an electrode assembly disposed within the case, the electrode assembly including at least a positive and a negative electrode member;
    a cover disposed to cover the opening of the case, the cover having a top surface and defining a hole having a counterbore structure; and
    a terminal structure attached to the cover, including:
        a gasket made of an insulating material and fittingly disposed within the hole and the counterbore and extending over said top surface of said cover,
        an under cover insulator member disposed below an under side of the cover, the insulator member defining a hole corresponding to the hole in the cover,
        a washer made of a conductive material and electrically connected to one of the electrode members of the electrode assembly, the washer being disposed below the insulator member and defining a hole corresponding to the hole in the cover, and
        a fastening device made of a conductive material and having a shaft passing through the gasket and the holes in the insulator member and the washer, the fastening device applying a pressure in an axial direction of the hole in the cover to press the gasket, the cover, the insulator and the washer against each other to form a seal, the fastening device being electrically connected to the washer and electrically insulated from the cover.

2. The energy storage device of claim 1, wherein the fastening device is electrically connected to one of the electrode members and forms a terminal of the energy storage device, and wherein the case is electrically connected to the other one of the electrode members and forms another terminal of the energy storage device.

3. The energy storage device of claim 1, wherein the fastening device has a head being in contact with the gasket and wherein the terminal structure further comprises a sealing ring disposed between the head of the fastening device and the gasket.

4. The energy storage device of claim 3, wherein the sealing ring is fanned as an integral part of the gasket.

5. The energy storage device of claim 3, wherein the sealing ring is formed as an integral part of the head of the fastening device.

6. The energy storage device of claim 1, wherein the terminal structure further comprises a sealing ring disposed between the gasket and the cover.

7. The energy storage device of claim 6, wherein the sealing ring is formed as an integral part of the gasket.

8. The energy storage device of claim 6, wherein the sealing ring is formed as an integral part of the cover in the counterbore.

9. The energy storage device of claim 3, wherein the sealing ring comprises a separate ring member.

10. The energy storage device of claim 6, wherein the sealing ring comprises a separate ring member.

11. An energy storage device comprising:

a case having an opening;

an electrode assembly disposed within the case, the electrode assembly including at least a positive and a negative electrode member;

a cover disposed to cover the opening of the case, the cover defining a hole having a counterbore structure; and a terminal structure attached to the cover, including:
a gasket made of an insulating material and fittingly disposed within the hole and the counterbore,
an under cover insulator member disposed below an under side of the cover, the insulator member defining a hole corresponding to the hole in the cover,
a washer made of a conductive material and electrically connected to one of the electrode members of the electrode assembly, the washer being disposed below the insulator member and defining a hole corresponding to the hole in the cover,
a fastening device made of a conductive material and having a shaft passing through the gasket and the holes in the insulator member and the washer, the fastening device applying a pressure in an axial direction of the hole in the cover to press the gasket, the cover, the insulator and the washer against each other to form a seal, the fastening device being electrically connected to the washer and electrically insulated from the cover, wherein the fastening device has a head being in contact with the gasket, and
a sealing ring disposed between the head of the fastening device and the gasket.

12. The energy storage device of claim 11, wherein the sealing ring is formed as an integral part of the gasket.

13. The energy storage device of claim 11, wherein the sealing ring is formed as an integral part of the head of the fastening device.

14. The energy storage device of claim 11, wherein the sealing ring comprises a separate ring member.

15. An energy storage device comprising:

a case having an opening;

an electrode assembly disposed within the case, the electrode assembly including at least a positive and a negative electrode member;

a cover disposed to cover the opening of the case, the cover defining a hole having a counterbore structure; and a terminal structure attached to the cover, including:
a gasket made of an insulating material and fittingly disposed within the hole and the counterbore,
an under cover insulator member disposed below an under side of the cover, the insulator member defining a hole corresponding to the hole in the cover,
a washer made of a conductive material and electrically connected to one of the electrode members of the electrode assembly, the washer being disposed below the insulator member and defining a hole corresponding to the hole in the cover,
a fastening device made of a conductive material and having a shaft passing through the gasket and the holes in the insulator member and the washer, the fastening device applying a pressure in an axial direction of the hole in the cover to press the gasket, the cover, the insulator and the washer against each other to form a seal, the fastening device being electrically connected to the washer and electrically insulated from the cover, and
a sealing ring disposed between the gasket and the cover, wherein the sealing ring comprises a separate ring member.

16. An energy storage device comprising:

a case having an opening;

an electrode assembly disposed within the case, the electrode assembly including at least a positive and a negative electrode member;

a cover disposed to cover the opening of the case, the cover defining a hole having a counterbore structure; and a terminal structure attached to the cover, including:
a gasket made of an insulating material and fittingly disposed within the hole and the counterbore,
an under cover insulator member disposed below an under side of the cover, the insulator member defining a hole corresponding to the hole in the cover,
a washer made of a conductive material and electrically connected to one of the electrode members of the electrode assembly, the washer being disposed below the insulator member and defining a hole corresponding to the hole in the cover,
a fastening device made of a conductive material and having a shaft passing through the gasket and the holes in the insulator member and the washer, the fastening device applying a pressure in an axial direction of the hole in the cover to press the gasket, the cover, the insulator and the washer against each other to form a seal, the fastening device being electrically connected to the washer and electrically insulated from the cover, and
a sealing ring disposed between the gasket and the cover, wherein the sealing ring is formed as an integral part of the gasket.

* * * * *

UNITED STATES PATENT AND TRADEMARK OFFICE
CERTIFICATE OF CORRECTION

PATENT NO. : 6,673,489 B2
DATED : January 6, 2004
INVENTOR(S) : Wendy Fong et al.

It is certified that error appears in the above-identified patent and that said Letters Patent is hereby corrected as shown below:

Column 9,
Line 11, change "scaling ring is fanned" to -- sealing ring is formed --.

Signed and Sealed this

Twenty-second Day of June, 2004

JON W. DUDAS
*Acting Director of the United States Patent and Trademark Office*